United States Patent
Wiesenburger

(10) Patent No.: US 9,992,928 B2
(45) Date of Patent: *Jun. 12, 2018

(54) FERTILIZER TUBE SYSTEM

(71) Applicant: Totally Tubular Mfg., Inc., Aberdeen, SD (US)

(72) Inventor: Brent W. Wiesenburger, Aberdeen, SD (US)

(73) Assignee: Totally Tubular Mfg., Inc., Aberdeen, SD (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/588,872

(22) Filed: May 8, 2017

(65) Prior Publication Data

US 2017/0238459 A1    Aug. 24, 2017

Related U.S. Application Data

(63) Continuation of application No. 15/095,570, filed on Apr. 11, 2016, now Pat. No. 9,642,301, which is a continuation-in-part of application No. 14/699,868, filed on Apr. 29, 2015, now Pat. No. 9,635,805, which is a continuation-in-part of application No. 14/682,486, filed on Apr. 9, 2015, now Pat. No. 9,642,300.

(51) Int. Cl.
| | | |
|---|---|---|
| *A01C 5/06* | (2006.01) | |
| *A01C 7/06* | (2006.01) | |
| *A01C 23/02* | (2006.01) | |

(52) U.S. Cl.
CPC ............ *A01C 23/025* (2013.01); *A01C 5/062* (2013.01); *A01C 7/06* (2013.01)

(58) Field of Classification Search
CPC .. A01C 5/062; A01C 5/06; A01C 5/00; A01C 7/06; A01C 7/00; A01C 23/025; A01C 23/023; A01C 23/02; A01C 23/00
See application file for complete search history.

(56) References Cited

U.S. PATENT DOCUMENTS

| | | |
|---|---|---|
| 791,465 A | 6/1905 | Henderson |
| 1,302,428 A | 4/1919 | Pereda |
| 2,874,878 A | 2/1959 | Stokland |
| 2,912,944 A | 11/1959 | Snow |
| 3,207,389 A | 9/1965 | Beebe |

(Continued)

OTHER PUBLICATIONS

Page 1 & p. 16 of Kinze Model 4900 Front Folding Planter Parts Manual; Manual at www.kinze.com/filesimages/manuals/4900_M0247-02_R0115.pdf; Received & Printed Mar. 19, 2015.

(Continued)

*Primary Examiner* — Christopher J. Novosad
(74) *Attorney, Agent, or Firm* — Neustel Law Offices

(57) ABSTRACT

A fertilizer tube system for efficiently dispensing and placing fertilizer within a furrow to minimize germination injury. The fertilizer tube system generally includes a fertilizer tube having an input opening at an upper end of the fertilizer tube and an output opening at a lower end of the fertilizer tube, an upper connector attached to an upper portion of the fertilizer tube, a central connector attached to a central portion of the fertilizer tube and a lower connector attached to a lower portion of the fertilizer tube.

17 Claims, 14 Drawing Sheets

(56) References Cited

U.S. PATENT DOCUMENTS

| | | | |
|---|---|---|---|
| 3,319,589 | A | 5/1967 | Moran |
| 3,632,043 | A | 1/1972 | Kirschmann |
| 3,653,550 | A | 4/1972 | Williams |
| 4,224,882 | A | 9/1980 | Cruse |
| 4,628,840 | A | 12/1986 | Jacobson |
| 4,656,957 | A | 4/1987 | Williamson |
| 4,947,770 | A | 8/1990 | Johnston |
| 4,998,488 | A | 3/1991 | Hansson |
| 5,027,724 | A | 7/1991 | Ptacek |
| 5,269,237 | A | 12/1993 | Baker |
| 5,370,068 | A | 12/1994 | Rawson |
| 5,461,994 | A | 10/1995 | Zimmerman |
| 5,477,792 | A | 12/1995 | Bassett |
| 5,622,124 | A | 4/1997 | Smith |
| 5,862,763 | A | 1/1999 | Dietrich, Sr. |
| 6,006,684 | A | 12/1999 | Whalen |
| 6,095,065 | A | 8/2000 | Dietrich, Sr. |
| 6,289,829 | B1 | 9/2001 | Fish |
| 6,363,870 | B1 | 4/2002 | King |
| 7,096,805 | B1 | 8/2006 | Wiesenburger |
| 7,128,007 | B1 | 10/2006 | Wiesenburger |
| 9,642,301 | B2 * | 5/2017 | Wiesenburger .......... A01C 7/06 |
| 2009/0308296 | A1 | 12/2009 | Senchuk |

OTHER PUBLICATIONS www.deere.com/en_US/products/equipment/planting_and_seeding_equipment/planters/row_un/its/max_emerge_5_row_unit . . . ; MaxEmerge 5 by John Deere; Received and Printed Apr. 27, 2015.

* cited by examiner

FERTILIZER TUBE SYSTEM

CROSS REFERENCE TO RELATED APPLICATIONS

The present application is a continuation of U.S. application Ser. No. 15/095,570 filed on Apr. 11, 2016 which issues as U.S. Pat. No. 9,642,301 on May 9, 2017, which is a continuation-in-part of U.S. application Ser. No. 14/699,868 filed on Apr. 29, 2015 now issued as U.S. Pat. No. 9,635,805, which is a continuation-in-part of U.S. application Ser. No. 14/682,486 filed on Apr. 9, 2015 which issues as U.S. Pat. No. 9,642,300 on May 9, 2017. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a fertilizer tube system for efficiently dispensing and placing fertilizer within a furrow to minimize germination injury.

Related Art

Any discussion of the related art throughout the specification should in no way be considered as an admission that such related art is widely known or forms part of common general knowledge in the field.

Liquid fertilizer applicators have been in use for years. Typically, the placement of liquid fertilizer in close proximity to seeds during the planting process is done to improve crop yields. Unfortunately, current liquid fertilizer applicators utilized in the farming industry sometimes directly apply liquid fertilizer to the seed which results in burning of the seed thereby increasing germination injury.

SUMMARY

An example embodiment of the present invention is directed to a fertilizer tube system. The fertilizer tube system includes a fertilizer tube having an input opening at an upper end of the fertilizer tube and an output opening at a lower end of the fertilizer tube, an upper connector attached to an upper portion of the fertilizer tube, a central connector attached to a central portion of the fertilizer tube and a lower connector attached to a lower portion of the fertilizer tube.

There has thus been outlined, rather broadly, some of the features of the fertilizer tube system in order that the detailed description thereof may be better understood, and in order that the present contribution to the art may be better appreciated. There are additional features of the fertilizer tube system that will be described hereinafter and that will form the subject matter of the claims appended hereto. In this respect, before explaining at least one embodiment of the fertilizer tube system in detail, it is to be understood that the fertilizer tube system is not limited in its application to the details of construction or to the arrangements of the components set forth in the following description or illustrated in the drawings. The fertilizer tube system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
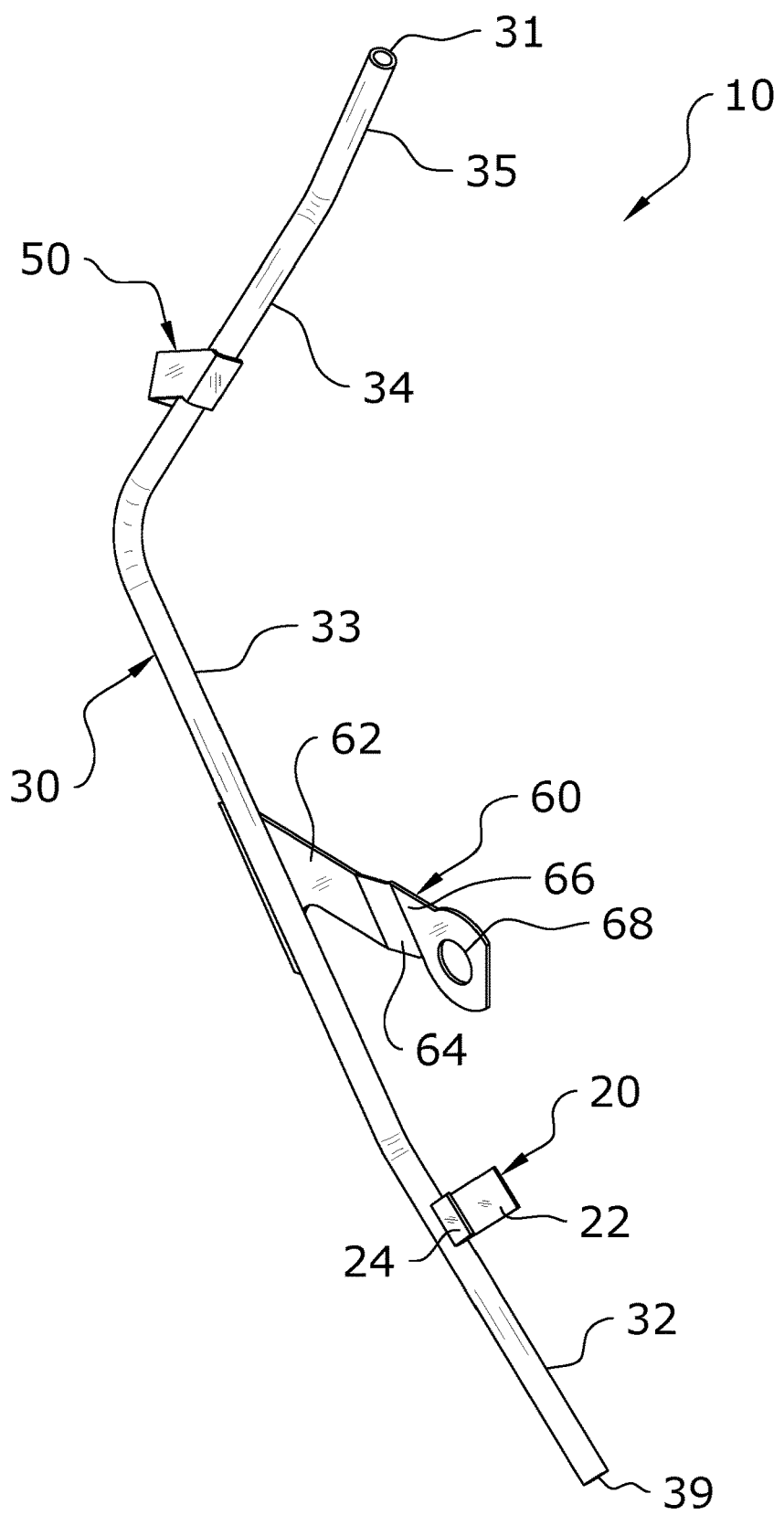
FIG. 1 is a rear left side perspective view of a fertilizer tube system in accordance with an example embodiment.
Figure 2:
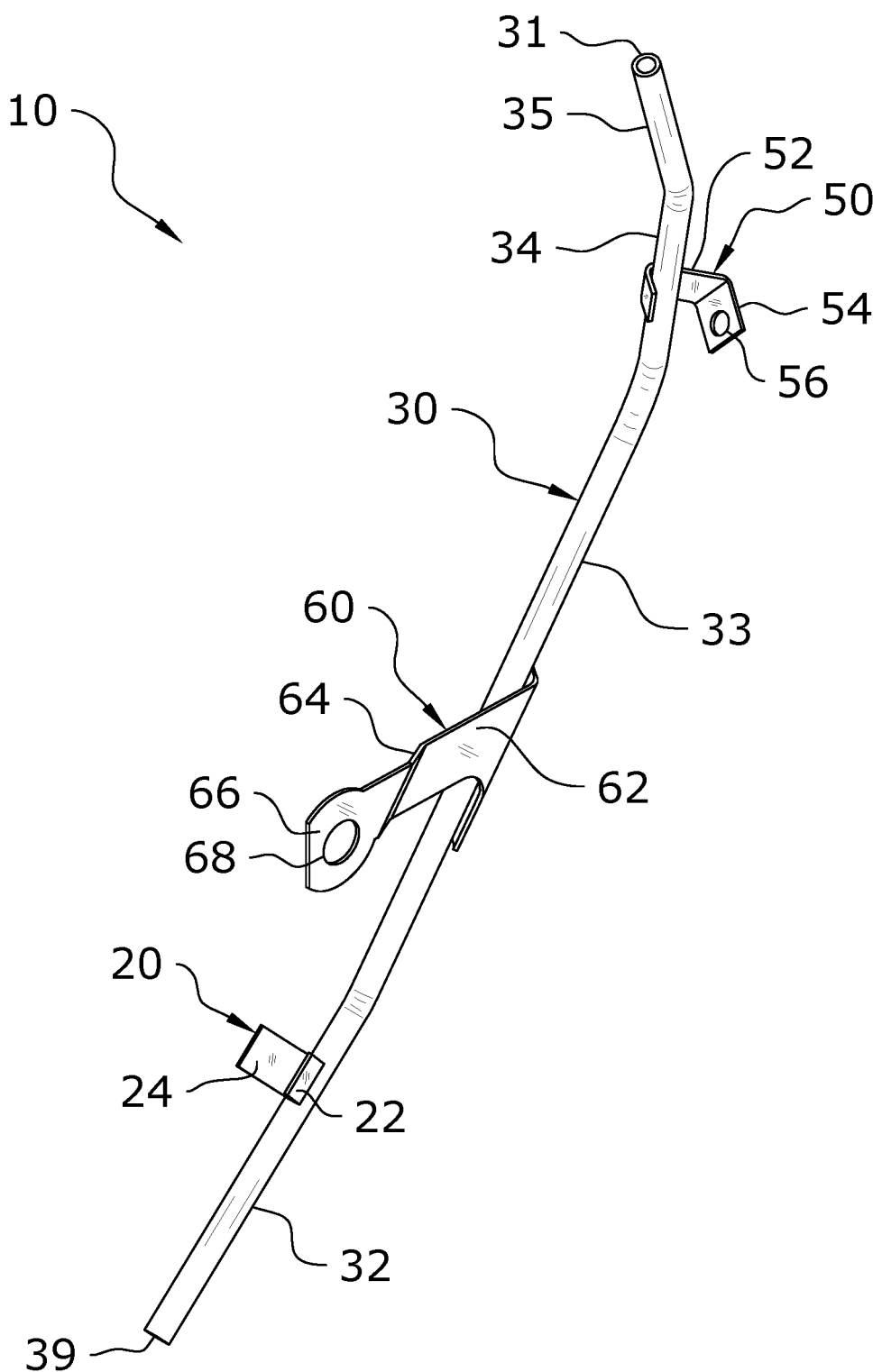
FIG. 2 is a rear right side perspective view of an exemplary embodiment.

A. Overview.

An example fertilizer tube system 10 generally comprises a fertilizer tube 30 having an input opening 31 at an upper end of the fertilizer tube 30 and an output opening 39 opening at a lower end of the fertilizer tube 30, an upper connector 50 attached to an upper portion of the fertilizer tube 30, a central connector attached to a central portion of the fertilizer tube 30 and a lower connector 20 attached to a lower portion of the fertilizer tube 30.

The present invention is designed to be utilized in combination with a liquid fertilizer system used on a crop planter implement but may be utilized to dispense additional types of fertilizer such as non-liquid fertilizer (e.g. particulate fertilizer). U.S. Pat. No. 7,096,805 (Liquid Fertilizer Application System) and U.S. Pat. No. 7,128,007 (Liquid Fertilizer Application System) both to Wiesenburger are hereby incorporated by reference herein in their entireties.

The present invention may be utilized with any type of planter implement designed for planting a row crop such as, but not limited to, the John Deere ExactEmerge™ Row Unit manufactured by Deere & Company in Moline, Ill. The present invention may be utilized with respect to various other types of planter implements.

B. Fertilizer Tube.

Figure 14:
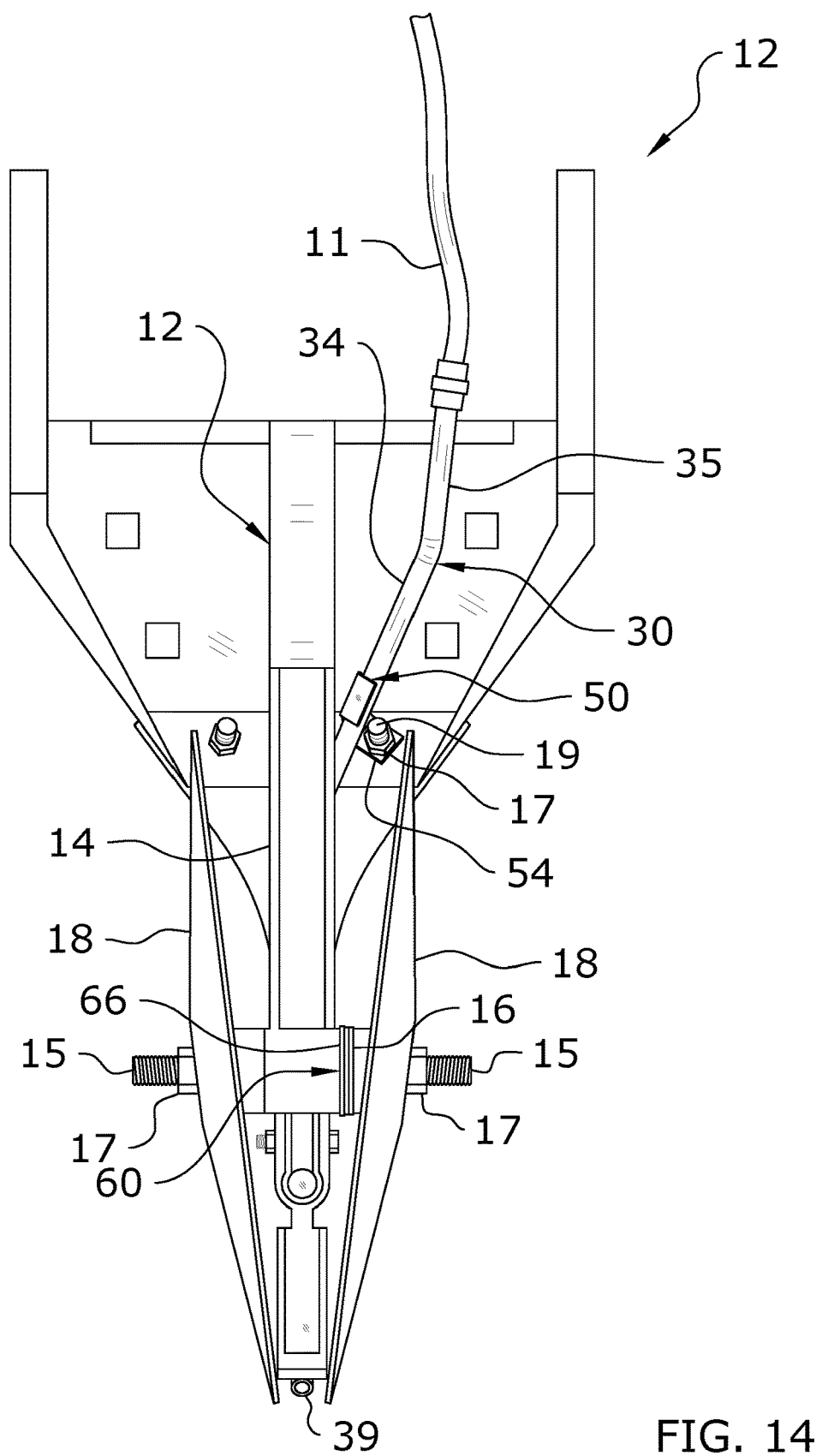
FIG. 14 is a rear view of an exemplary embodiment attached to the planter shank with the seed tube attached.
Figure 15:
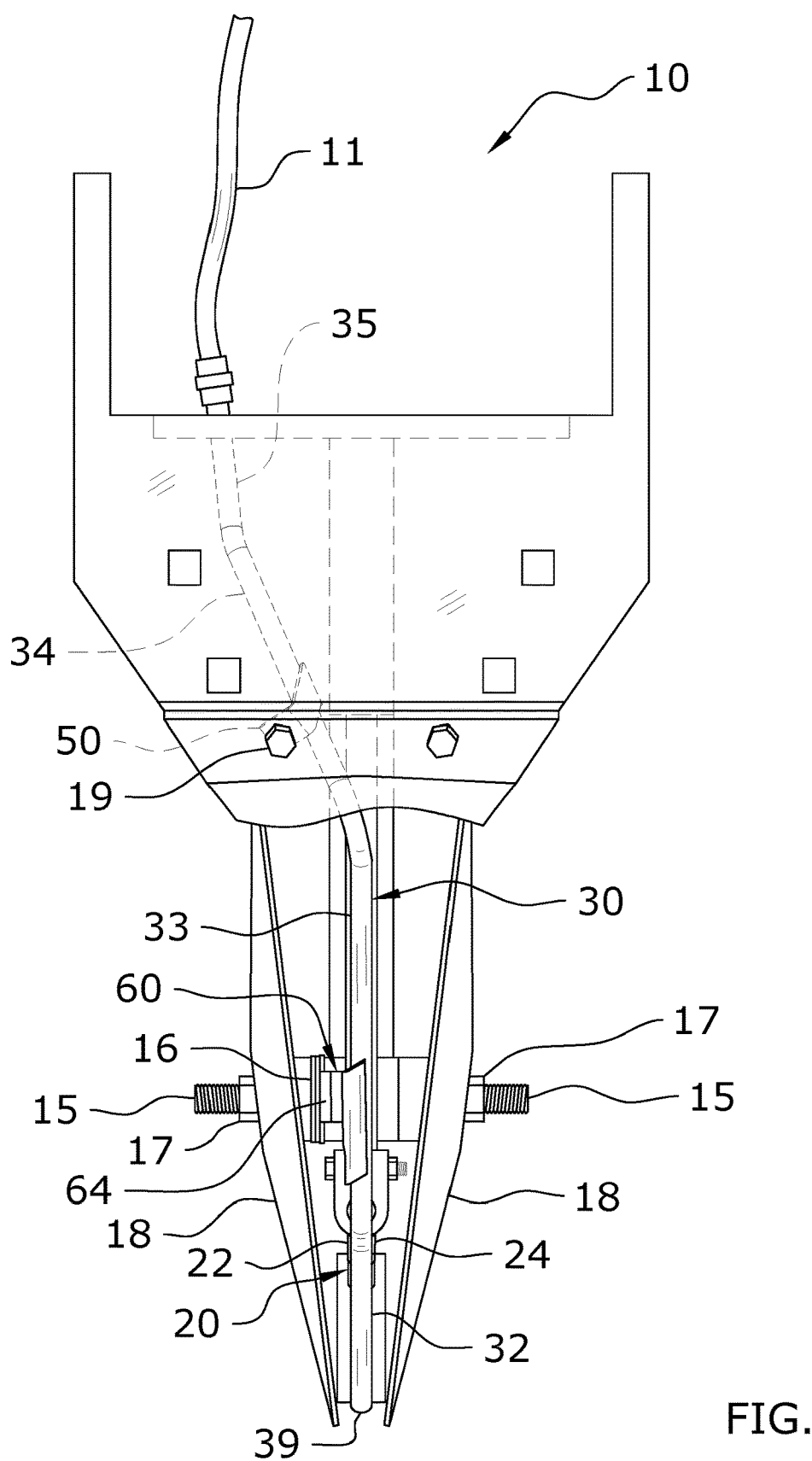
FIG. 15 is a front view of an exemplary embodiment attached to the planter shank.

The fertilizer tube 30 is comprised of an elongated structure. The fertilizer tube 30 is not a straight structure as best illustrated in FIGS. 1 through 8 of the drawings. The fertilizer tube 30 has an input opening 31 at an upper end of the fertilizer tube 30 and an output opening 39 opening at a lower end of the fertilizer tube 30 as illustrated in FIGS. 1 through 8 of the drawings. The input opening 31 is capable of being fluidly connected to a conventional liquid fertilizer system to receive a liquid fertilizer from the liquid fertilizer. The output opening 39 opening dispenses the liquid fertilizer into a seed furrow or near a seed furrow created by the disks 18 of the planter implement. The lower portion of the fertilizer tube 30 is positioned between a pair of disks 18 of the planter implement when the fertilizer tube 30 is attached to the planter shank 14 as illustrated in FIGS. 14 and 15 of the drawings.

As further illustrated in FIGS. 1 through 8, the fertilizer tube 30 is preferably comprised of a continuous single structure. The fertilizer tube 30 may also be comprised of a plurality of sections connected together permanently or non-permanently. The fertilizer tube 30 is preferably comprised of a rigid material such as, but not limited to, metal. The fertilizer tube 30 preferably has a circular cross sectional area but may have different cross sectional shapes (e.g. rectangular, oval). The lumen of the fertilizer tube 30 may be consistently in width or differing in width along the length of the fertilizer tube 30. The fertilizer tube 30 is preferably comprised of a continuous single tubular structure as illustrated in FIGS. 1 through 4 of the drawings. In particular, the fertilizer tube 30 is preferably constructed of a single piece of metal tubing that is bent to form the fertilizer tube 30.

A coupler 40 fluidly connects the upper end of the fertilizer tube 30 to a fertilizer delivery tube 11 from the liquid fertilizer system of the planter implement. The coupler 40 is preferably comprised of a quick coupler 40 to allow for simple and easy connection of the fertilizer delivery tube 11 to the fertilizer tube 30.

As shown in FIGS. 1 through 8 of the drawings, the fertilizer tube 30 is comprised of a first segment 32 on the lower portion of the fertilizer tube 30, a second segment 33 extending from the first segment 32, a third segment 34 extending from the second segment 33, and a fourth segment 35 extending from the third segment 34. Each segment is defined by a bend or corner in the fertilizer tube 30 redirecting the fertilizer tube 30. Each segment is preferably comprised of a substantially straight structure having an independent longitudinal axis that doesn't align with any of the other segments' longitudinal axis.

Figure 3:
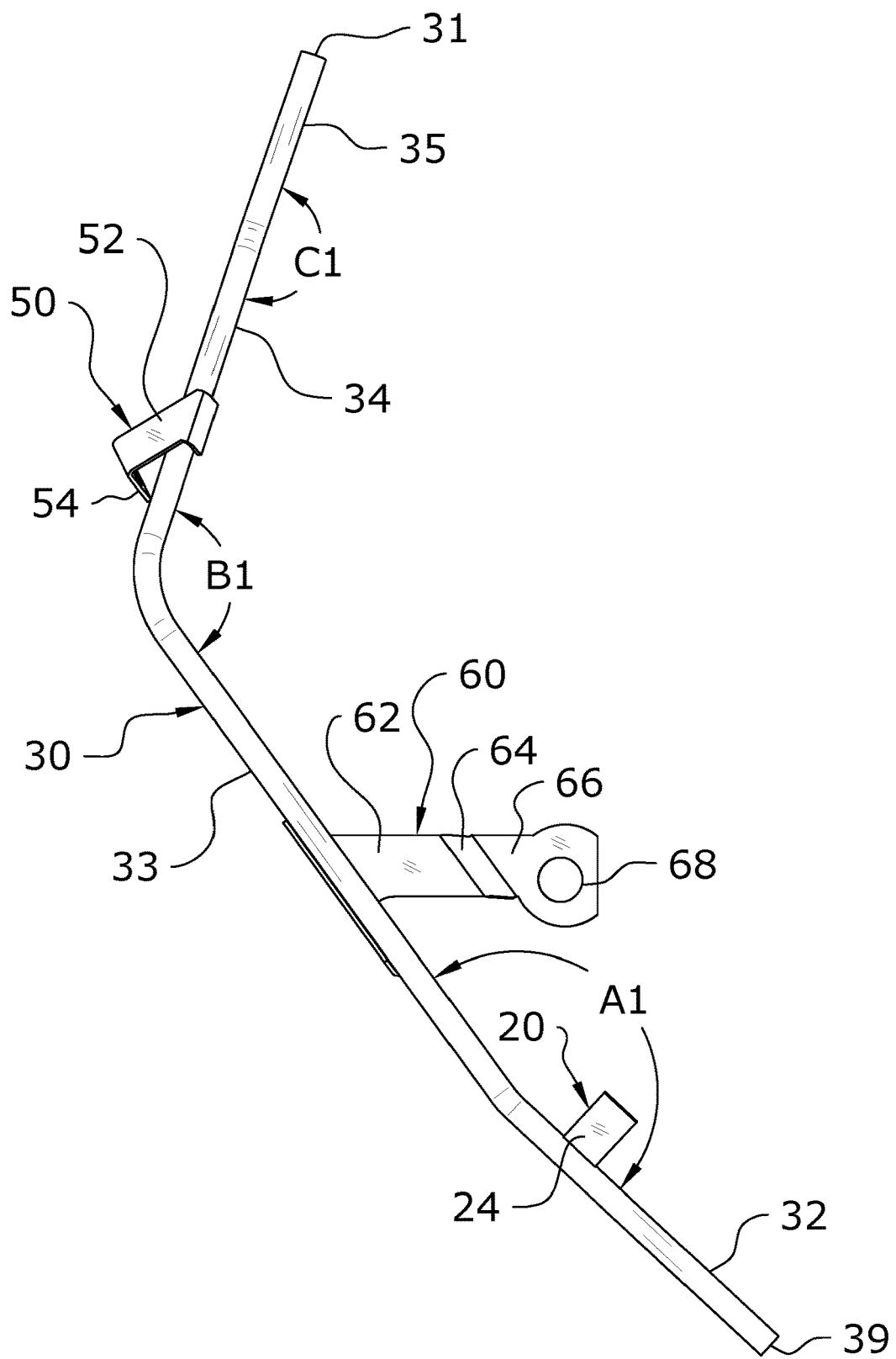
FIG. 3 is a left side view of an exemplary embodiment.
Figure 4:
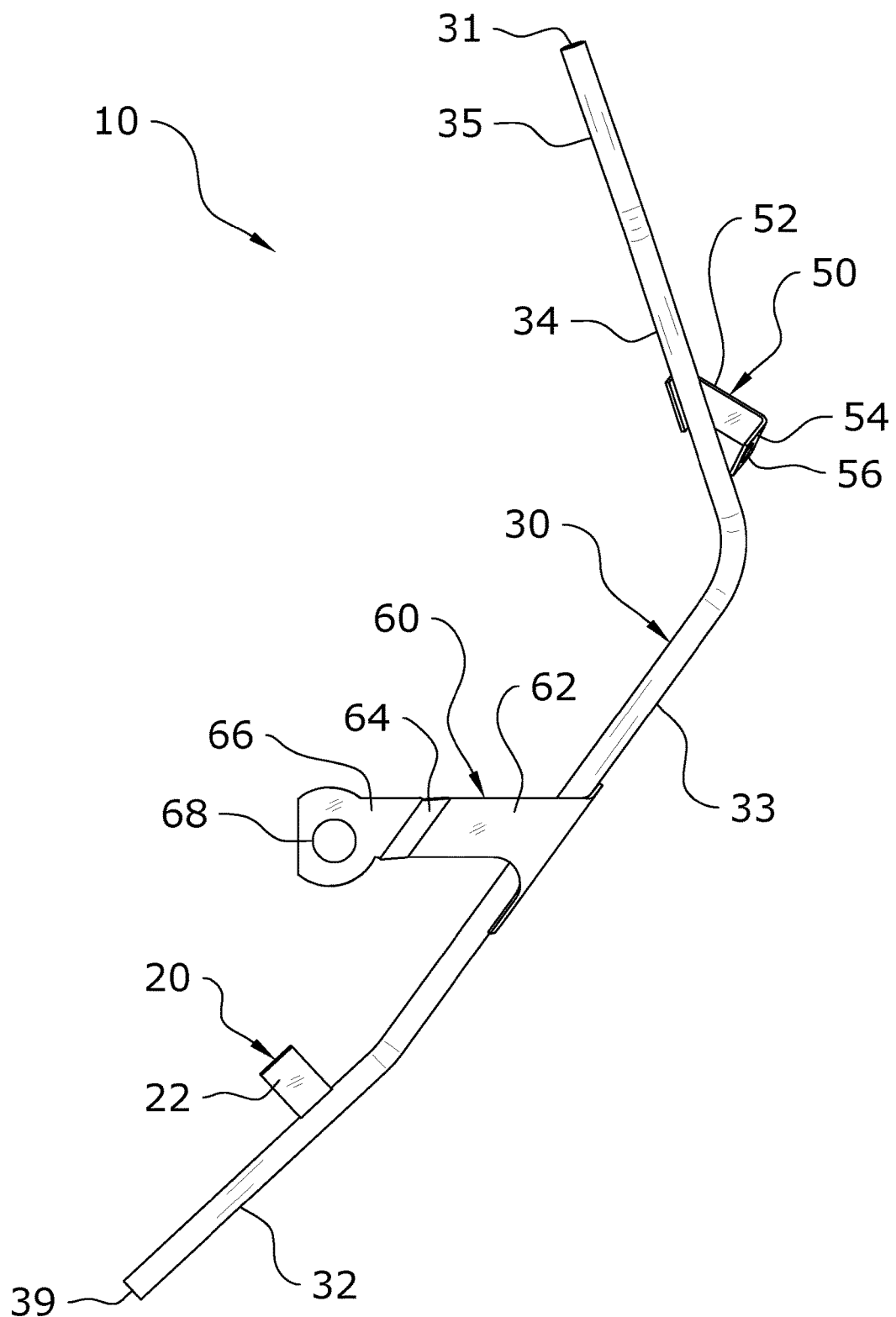
FIG. 4 is a right side view of an exemplary embodiment.
Figure 5:
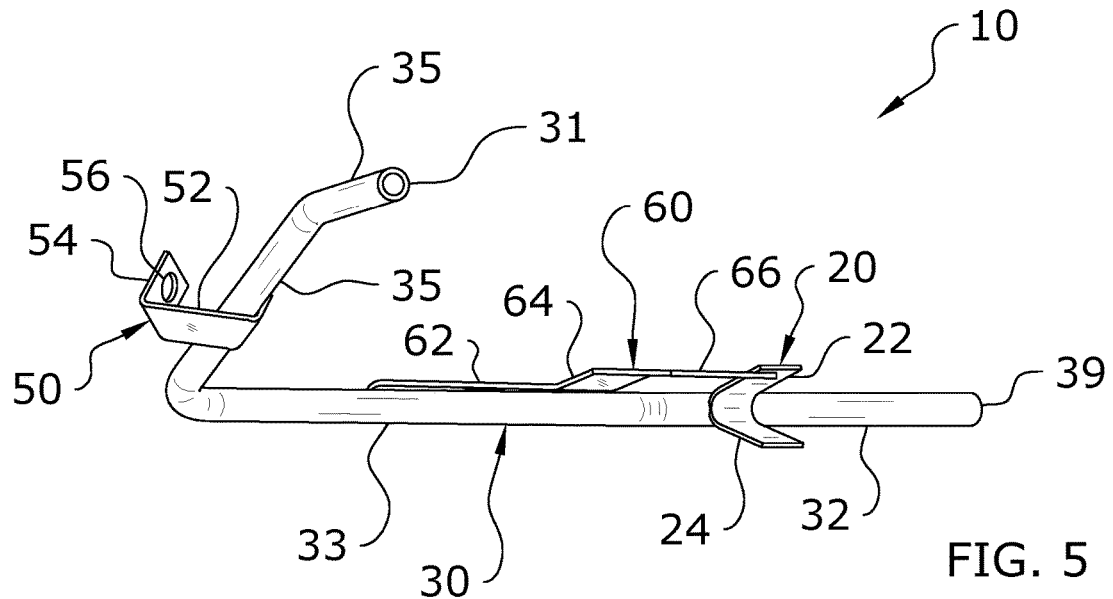
FIG. 5 is a top view of an exemplary embodiment.

When in use, the fertilizer tube 30 will be positioned in front of the guard scraper with the front edge angled downwardly and rearwardly as best illustrated in FIGS. 3 and 4. A portion of the first segment 32 of the fertilizer tube 30 will wear from engaging the earth over time.

The fertilizer tube 30 is comprised of a first segment 32 adapted to be positioned adjacent to a front edge of the planter shank 14 and a second segment 33 extending forwardly from the first segment 32. The first segment 32 has a first angle with respect to a horizontal plane (e.g. a ground surface) when the fertilizer tube 30 is attached to the planter shank 14 as best illustrated in FIGS. 3 and 4 of the drawings. The second segment 33 extends forwardly from the end of the first segment 32 at a second angle with respect to the horizontal plane (e.g. a ground surface) when the fertilizer tube 30 is attached to the planter shank 14 as best illustrated in FIGS. 3 and 4 of the drawings. While both the first segment 32 and the second segment 33 extend upwardly and forwardly, the second angle for the second segment 33 is greater than the first angle for the first segment 32 as further illustrated in FIGS. 3 and 4. The first segment 32 and the second segment 33 are preferably aligned along a common vertical plane as illustrated in FIGS. 5 through 8 of the drawings. The output opening 39 opening is within a lower distal end of the first segment 32.

Figure 6:
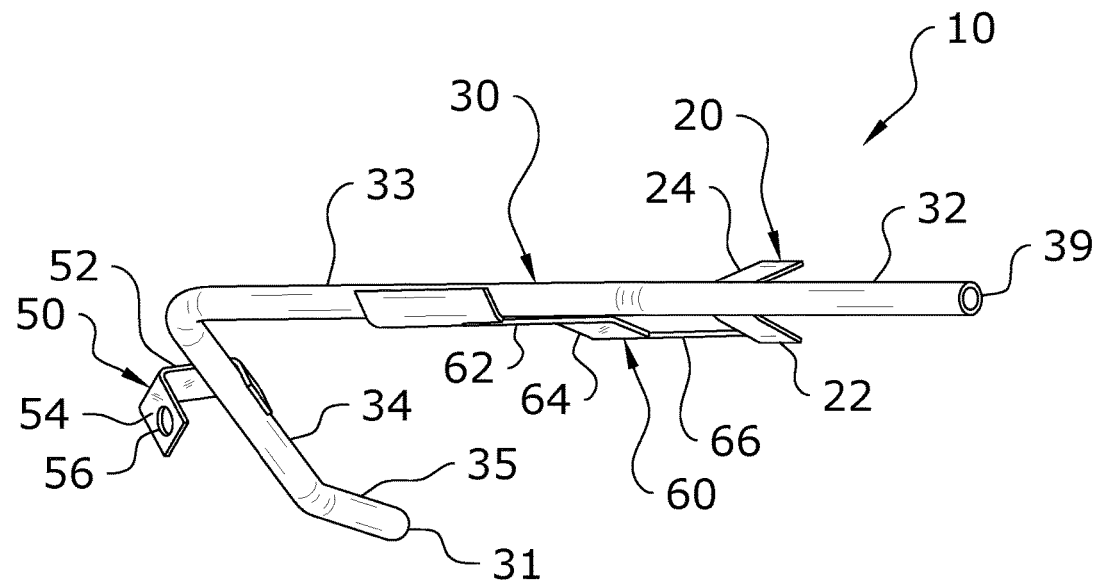
FIG. 6 is a bottom view of an exemplary embodiment.
Figure 7:
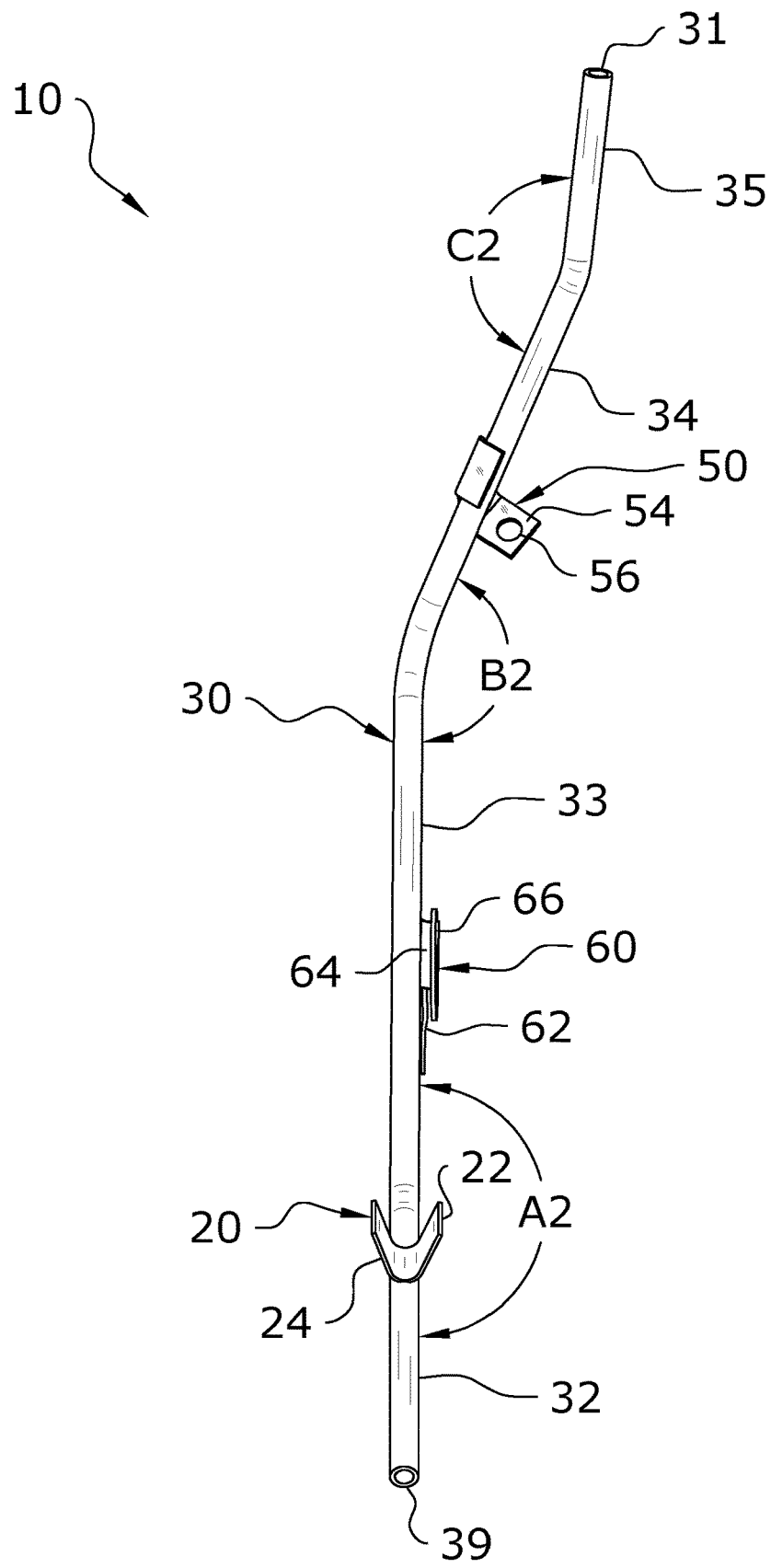
FIG. 7 is a rear view of an exemplary embodiment.
Figure 8:
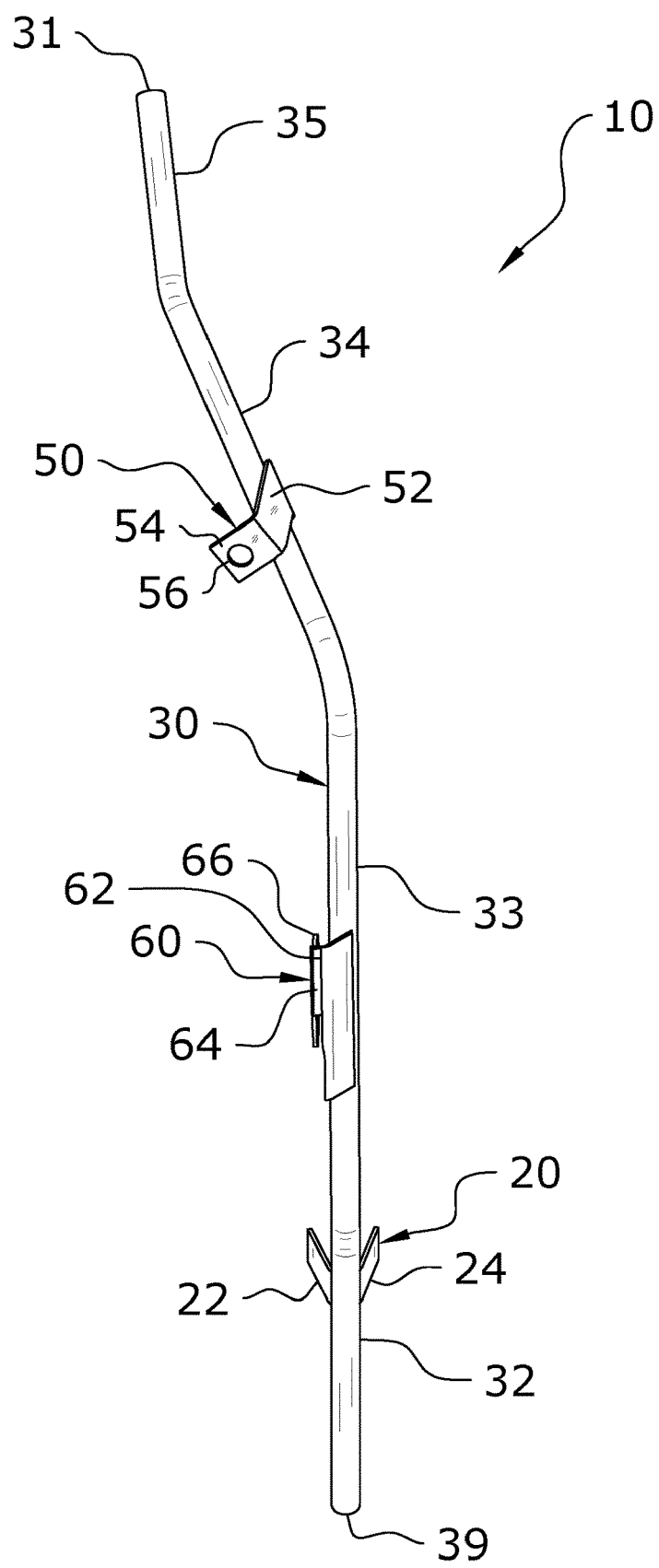
FIG. 8 is a front view of an exemplary embodiment.
Figure 9:
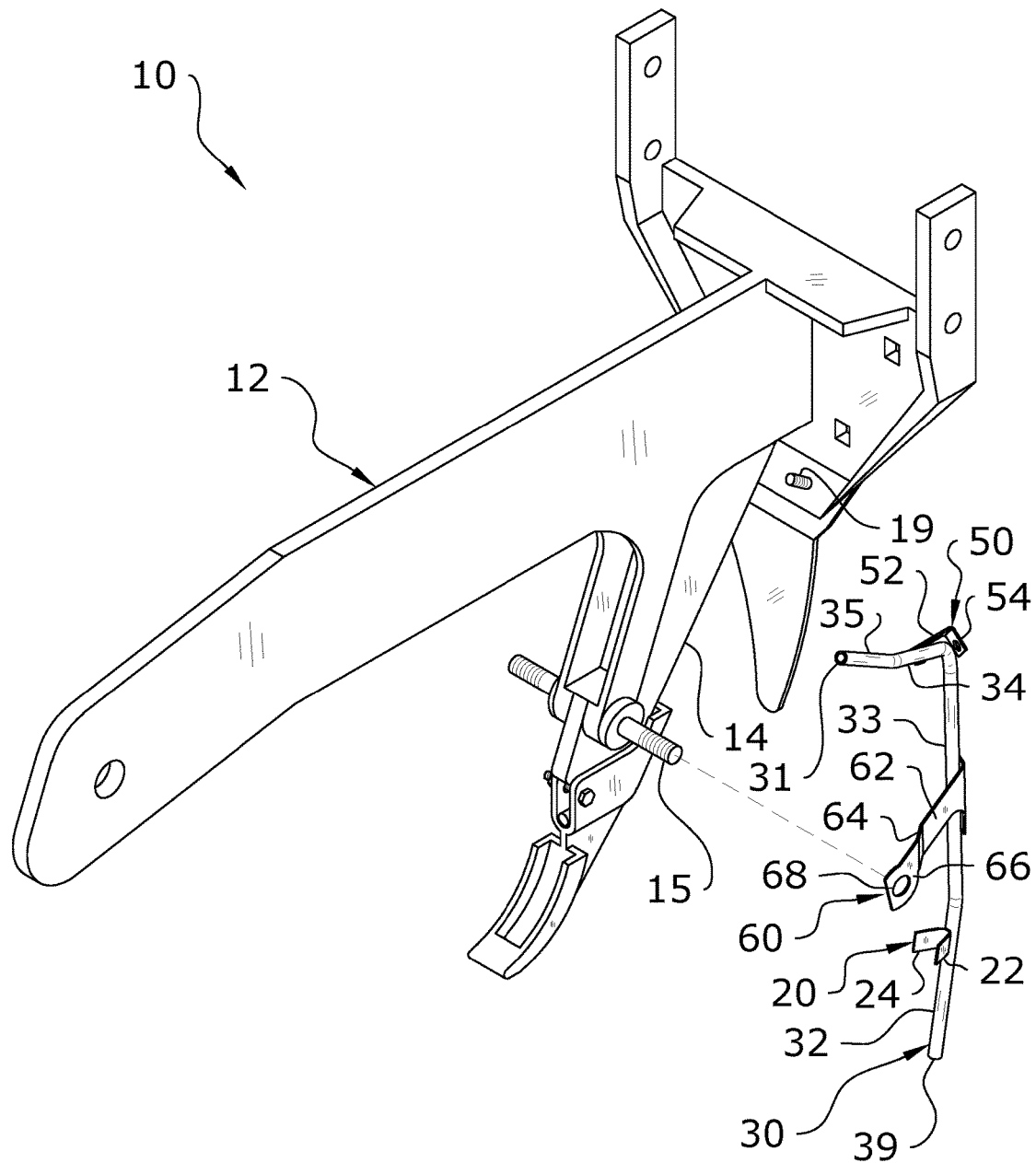
FIG. 9 is an exploded rear right side perspective view of an exemplary embodiment with respect to a planter frame to be installed upon.

The angle A1 between the first segment 32 and the second segment 33 as measured from the left side in FIG. 3 is approximately 169 degrees but may vary greater or less. The angle A2 between the first segment 32 and the second segment 33 as measured from the rear in FIG. 7 is approximately 180 degrees but may vary greater or less. It is preferable that the second segment 33 is parallel to a vertical plane comprised of a plane that is parallel to the forward path of movement of the planter implement and the corresponding planter shank 14 that is vertically aligned. It is further preferable that both the first segment 32 and the second segment 33 are both parallel with respect to the vertical plane as illustrated in FIGS. 6 and 8 of the drawings. The second segment 33 is preferably comprised of a straight segment extending from a first corner between the second segment 33 and the first segment 32 as illustrated in FIGS. 3 and 4 of the drawings. The second segment 33 has a longitudinal axis that is more vertically orientated than the first segment 32 when the fertilizer tube 30 is attached to the planter shank 14 as illustrated in FIGS. 3 and 4 of the drawings.

The fertilizer tube 30 is further comprised of a third segment 34 and a fourth segment 35, wherein the third segment 34 extends upwardly and rearwardly from the second segment 33 and the fourth segment 35 extends upwardly and rearwardly from the third segment 34. The third segment 34 and the fourth segment 35 are each comprised of a substantially straight structure. The third segment 34 and the fourth segment 35 both preferably extend rearwardly at an approximately same angle with respect to the horizontal plane, though different angles may be used. As best shown in FIGS. 7 and 8, the third segment 34 and the fourth segment 35 are preferably not aligned along the common vertical plane in one embodiment of the invention. The third segment 34 extends to the right of the common vertical plane and the fourth segment 35 extends at angle between the common vertical plane and the third segment 34 as best shown in FIG. 7.

The third segment 34 extends upwardly and rearwardly from the end of the second segment 33 opposite of the first segment 32 at a third angle with respect to the horizontal plane (e.g. a ground surface) when the fertilizer tube 30 is attached to the planter shank 14 as further shown in FIGS. 3 and 4 of the drawings. While the first segment 32, the second segment 33 and the third segment 34 all extend upwardly, the third angle for the third segment 34 is in an substantially opposite direction of the first angle for the first segment 32 and the second angle for the second segment 33 as illustrated in FIGS. 3 and 4 of the drawings. The angle B1 between the second segment 33 and the third segment 34 as measured from the left side in FIG. 3 is approximately 126 degrees but may vary greater or less. The angle B2 between the second segment 33 and the third segment 34 as measured from the rear in FIG. 7 is approximately 157 degrees but may vary greater or less. The third segment 34 is preferably comprised of a straight segment extending from a second corner between the third segment 34 and the second segment 33 as illustrated in FIGS. 3 and 4 of the drawings. The third segment 34 has a longitudinal axis that is more vertically orientated than the first segment 32 and the second segment 33 when the fertilizer tube 30 is attached to the planter shank 14 as illustrated in FIGS. 3 and 4 of the drawings.

The fourth segment 35 extends upwardly from the end of the third segment 34 opposite of the second segment 33 at a fourth angle with respect to the horizontal plane measured from the side (e.g. a ground surface) when the fertilizer tube 30 is attached to the planter shank 14 as further shown in FIGS. 3 and 4 of the drawings. While the first segment 32, second segment 33, the third segment 34 and the fourth segment 35 all extend upwardly, the fourth angle for the fourth segment 35 is preferably greater than the first angle for the first segment 32 and the second angle for the second segment 33 as illustrated in FIGS. 3 and 4 of the drawings. The angle C1 between the third segment 34 and the fourth segment 35 as measured from the left side in FIG. 3 is approximately 180 degrees but may vary greater or less. The angle C2 between the third segment 34 and the fourth segment 35 as measured from the rear in FIG. 7 is approximately 163 degrees but may vary greater or less.

The first segment 32 is preferably approximately 5.25 inches in length, the second segment 33 is preferably approximately 9 inches in length, the third segment 34 is preferably approximately 5.5 inches in length and the fourth segment 35 is preferably approximately 2.5 inches in length. The respective lengths of all of the segments 32, 33, 34, 35 may vary depending upon the application, how close the lower end of the fertilizer tube 30 is to be positioned to the ground surface and various other factors.

C. Upper Connector.

Figure 10:
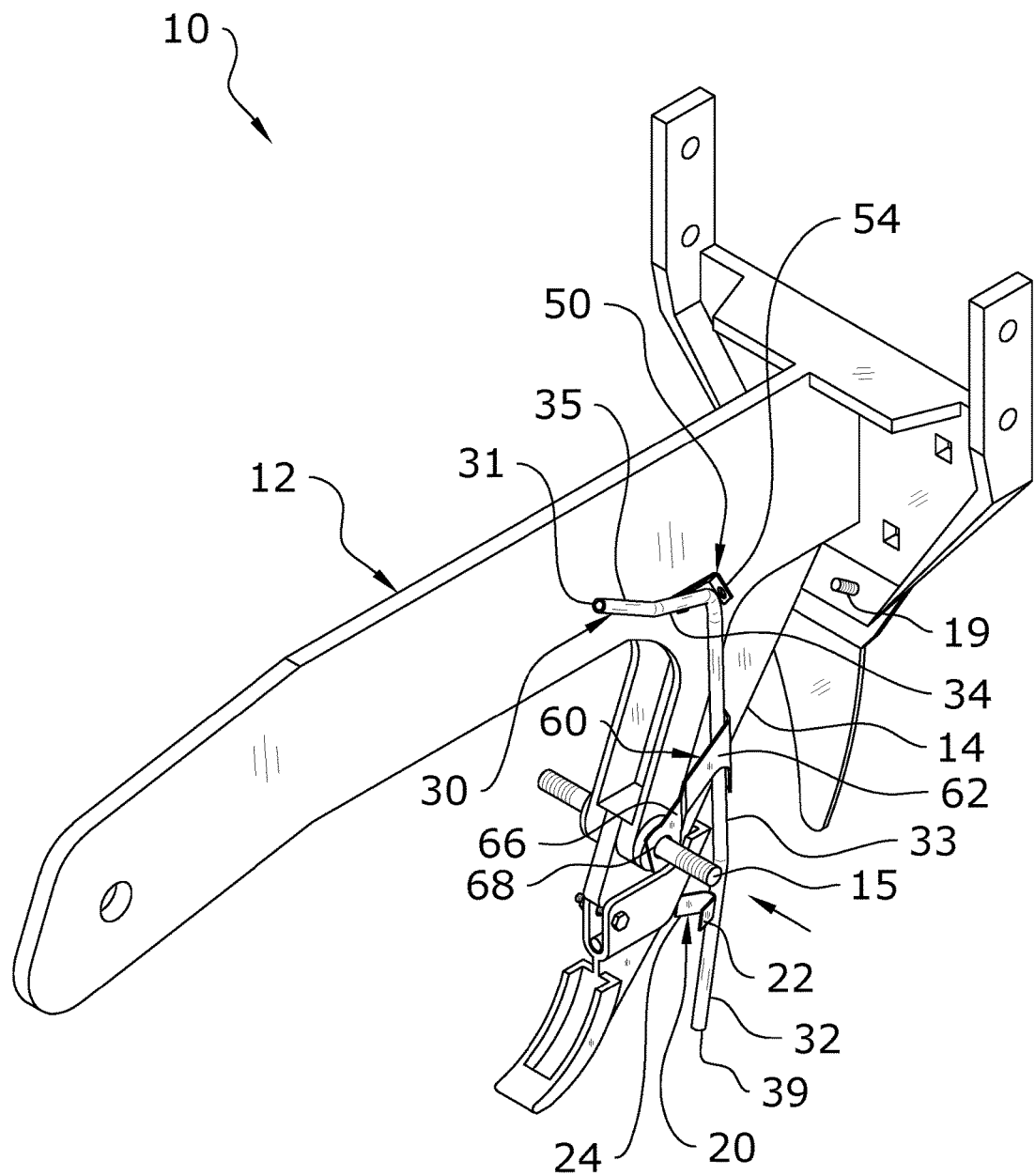
FIG. 10 is a rear right side perspective view of an exemplary embodiment being slid upon the mounting member of the planter shank.
Figure 11:
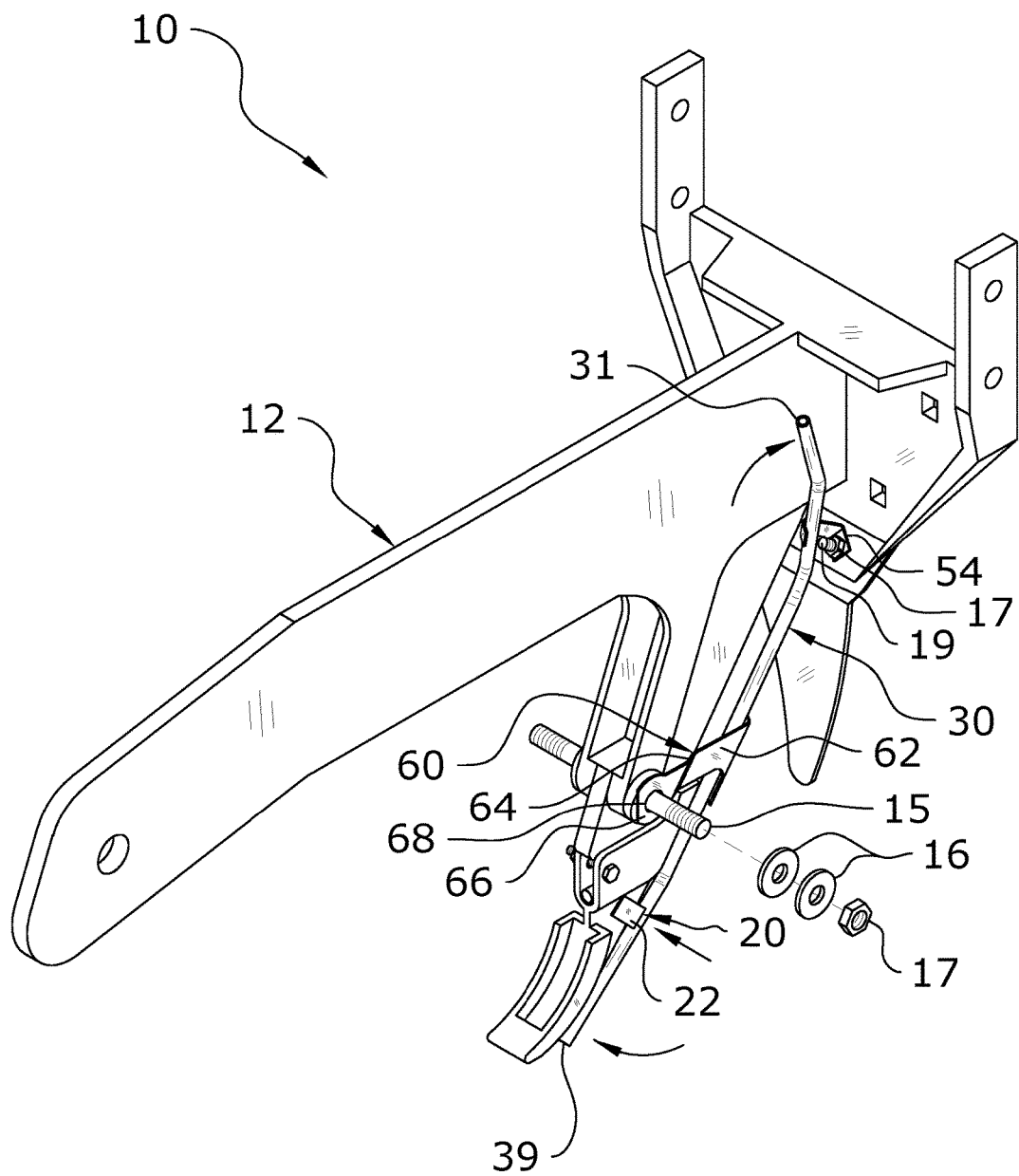
FIG. 11 is a rear right side perspective view of an exemplary embodiment being rotated into the installed position and the tab bent over the planter shank to prevent removal of the invention from the planter shank.

The upper connector 50 is attached to an upper portion of the fertilizer tube 30 such as, but not limited to, the third segment 34 as illustrated in FIGS. 1 through 8 of the drawings. The upper connector 50 is adapted for connecting to an upper fastener 19 of a planter frame 12 (e.g. a threaded member 19 extending rearwardly from the planter frame 12 as shown in FIG. 10 of the drawings. The upper connector 50 is comprised of an inner portion 52 attached (e.g. welded) to the fertilizer tube 30, an outer portion 54 extending from the inner portion 52 at an angle and an aperture 56 within the outer portion 54. The aperture 56 is sized to slidably receive the upper fastener 19. The upper connector 50 is secured to the planter frame 12 using a threaded nut 17 threadably connected to the upper fastener 19 as shown in FIG. 11 of the drawings.

D. Lower Connector.

The lower connector 20 is attached to a lower portion of the fertilizer tube 30 such as, but not limited to, the first segment 32. The lower connector 20 is adapted for connecting to a lower portion of a planter shank 14. The lower connector 20 is preferably comprised of a bendable material. The lower connector 20 is preferably constructed of a first portion 22 and a second portion 24 that extend rearwardly from the fertilizer tube 30. The lower connector 20 is further preferably comprised of a substantially V-shaped structure or U-shaped structure adapted to be positioned about a front edge of the planter shank 14. When the front edge of the planter shank 14 is positioned within the inner portion of the lower connector 20, the first portion 22 and the second portion 24 are bent towards one another to snugly and frictionally engage the planter shank 14 to prevent movement of the lower portion of the fertilizer tube 30. The lower connector 20 is preferably comprised of a bendable material such as a bendable metal material to allow an installer the ability to bend the first portion 22 and second portion 24 adjacent to the sides of the planter shank 14 as illustrated in FIG. 11 of the drawings.

E. Intermediate Connector.

The intermediate connector 60 attached the fertilizer tube 30 between the upper connector 50 and the lower connector 20 such as, but not limited to the second segment 33. The intermediate connector 60 is adapted for connecting to an axle 15 of the planter shank 14 that is used for supporting the disks 18 of the planter. The intermediate connector 60 preferably extends rearwardly in a substantially horizontal manner as shown in FIGS. 3 and 4, though various other angles may be used. The intermediate connector 60 is illustrated as having a flat structure that has a plane that is substantially vertically orientated, however, various other structures may be used for the intermediate connector 60.

The intermediate connector 60 is comprised of an inner portion 62 extending rearwardly, a middle portion 64 extending rearwardly from the inner portion 62 of the intermediate connector 60 at an angle, an outer portion 66 extending rearwardly from the middle portion 64 of the intermediate connector 60 substantially parallel with respect to the inner portion 62 of the intermediate connector 60, and an aperture 68 within the outer portion 66. The aperture 68 slidably receives the right portion of the axle 15 of the planter shank 14 used to support the right disk 18. However, the aperture 68 may be formed to be positioned upon the left portion of the axle 15 on the opposite side of the planter shank 14. One or more washers 16 are positioned over the intermediate connector 60 after being positioned upon the axle 15 and then the right disk 18 is attached with a threaded fastener (e.g. threaded nut 17) to the axle 15 as illustrated in FIGS. 11, 12, 14 and 15.

F. Operation of Preferred Embodiment.

In use, a fertilizer tube 30 is attached to each planter shank 14 of a planter implement. To assemble the fertilizer tube 30 to the planter implement, the user positions the intermediate connector 60 upon the axle 15 as shown in FIG. 10. The user then rotates the fertilizer tube 30 so that the lower connector 20 receives the front edge of the planter shank 14 and the aperture 56 of the upper connector 50 passes over the upper fastener 19 of the planter frame 12 as shown in FIG. 11 of the drawings. The user then squeezes or otherwise compresses the lower connector 20 so that the first portion 22 and the second portion 24 frictionally engage the planter shank 14 to prevent movement of the lower portion of the fertilizer tube 30 as illustrated in FIG. 11 of the drawings. A threaded nut 17 or other type of fastener is used to secure the upper connector 50 to the upper fastener 19 as shown in FIG. 11. The disks 18 are then attached to the opposing portions of the axle 15 extending from the planter shank 14 as shown in FIGS. 13 through 15 of the drawings.

Figure 12:
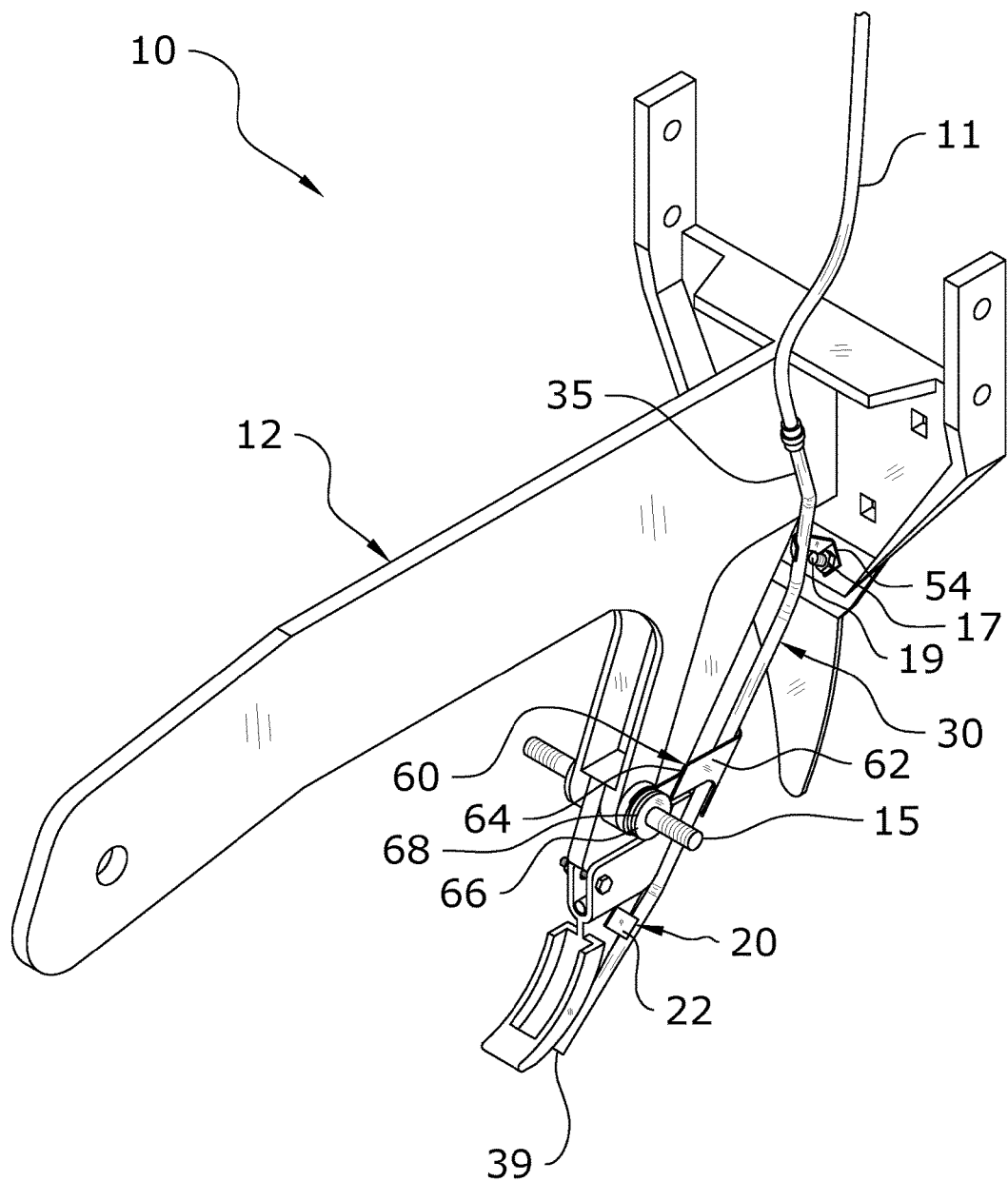
FIG. 12 is a rear right side perspective view of an exemplary embodiment installed upon the planter shank and the fertilizer delivery tube attached to the fertilizer tube.
Figure 13:
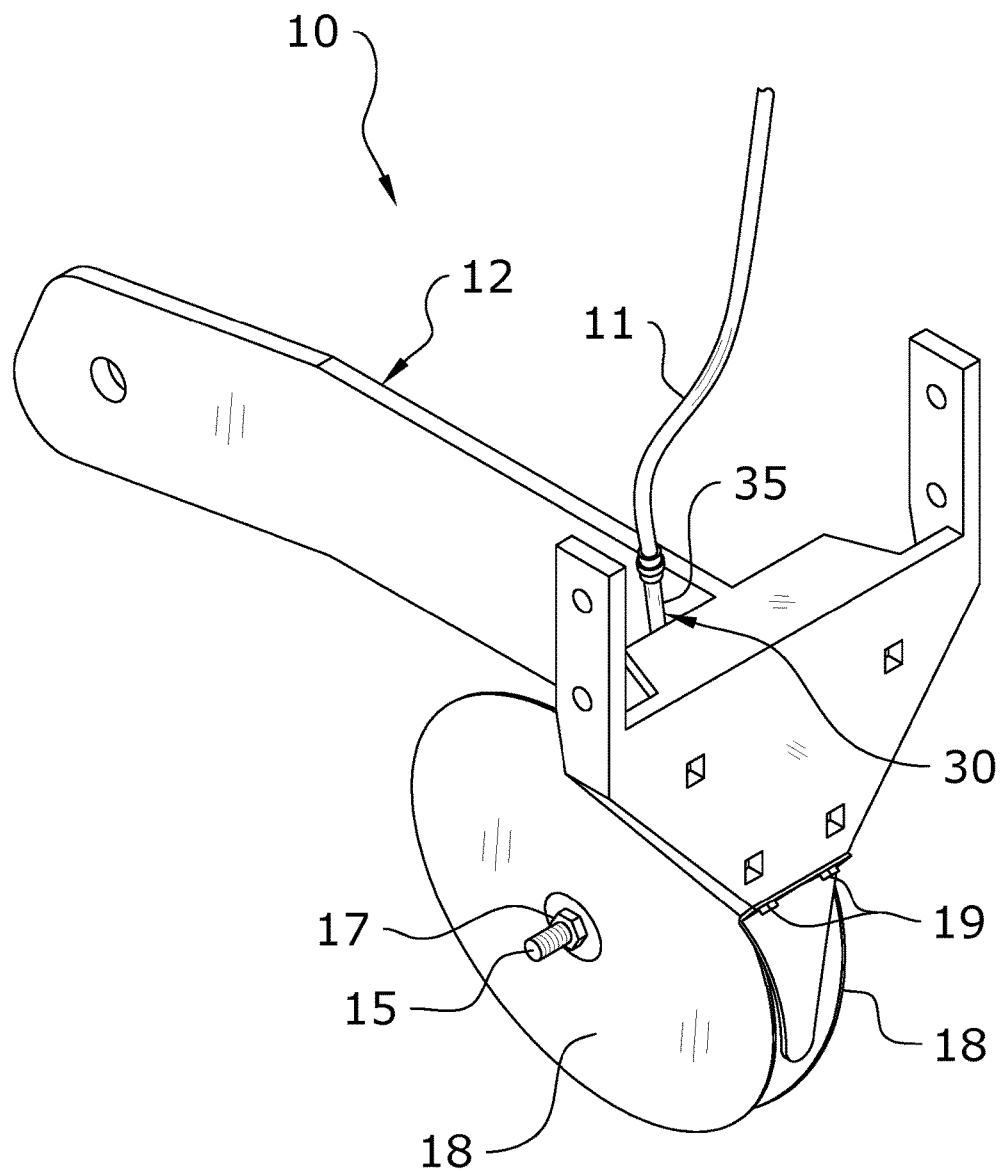
FIG. 13 is a front right side perspective view of an exemplary embodiment attached to the planter shank with the disks attached.

When fully assembled and attached to the planter frame 12, the upper portion of the fertilizer tube 30 extends around a rearward extending upper portion of the planter frame 12 as best illustrated in FIGS. 12 and 13. The user then uses the coupler 40 (e.g. a compression fitting) to connect the fertilizer tube 30 to a fertilizer delivery tube 11 as shown in FIGS. 12 through 15 of the drawings. Each fertilizer delivery tube 11 comes from a fertilizer reservoir or manifold and supplies the fertilizer to each fertilizer tube 30.

As the planter implement is pulled through the soil, the disks 18 create a V-shaped furrow in the soil which is well-known in the art of planters. The output opening 39 opening of the fertilizer tube 30 emits the liquid fertilizer onto the lower surface of the furrow in front of the seed tube in preparation for the disbursement of the seed from the seed tube. The seed is then dispensed from the seed tube and placed above the fertilizer within the furrow. The furrow is finally covered with soil to allow the seed to grow.

Unless otherwise defined, all technical and scientific terms used herein have the same meaning as commonly understood by one of ordinary skill in the art to which this invention belongs. Although methods and materials similar to or equivalent to those described herein can be used in the practice or testing of the fertilizer tube system, suitable methods and materials are described above. All publications, patent applications, patents, and other references mentioned herein are incorporated by reference in their entirety to the extent allowed by applicable law and regulations. The fertilizer tube system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A fertilizer tube system for attachment to a planter implement, comprising:
    a fertilizer tube having an input opening at an upper end of the fertilizer tube and an output opening at a lower end of the fertilizer tube, wherein the input opening is capable of being connected to a fertilizer system to receive a fertilizer from the fertilizer system and wherein the output opening dispenses the fertilizer into a seed furrow;
    an upper connector attached to an upper portion of the fertilizer tube, wherein the upper connector is adapted for connecting to an upper fastener of a planter frame;
    a lower connector attached to a lower portion of the fertilizer tube, wherein the lower connector is adapted for connecting to a lower portion of a planter shank; and
    an intermediate connector attached to the fertilizer tube between the upper connector and the lower connector, wherein the intermediate connector is adapted for connecting to an axle of the planter shank.

2. The fertilizer tube system of claim 1, wherein the lower connector is comprised of a bendable material.

3. The fertilizer tube system of claim 1, wherein the fertilizer tube is comprised of a continuous single structure.

4. The fertilizer tube system of claim 1, wherein the fertilizer tube is comprised of a rigid material.

5. The fertilizer tube system of claim 1, wherein the fertilizer tube is comprised of a metal.

6. The fertilizer tube system of claim 1, wherein the fertilizer tube is comprised of a first segment adapted to be positioned adjacent to a front edge of the planter shank and a second segment extending forwardly from the first segment, wherein the first segment has a first angle with respect to a horizontal plane and wherein the second segment has a second angle with respect to the horizontal plane, and wherein the second angle is greater than the first angle.

7. The fertilizer tube system of claim 6, wherein the output opening is within a lower distal end of the first segment, and wherein the first segment is comprised of a substantially straight structure.

8. The fertilizer tube system of claim 6, wherein the fertilizer tube is comprised of a third segment and a fourth segment, wherein the third segment extends upwardly and rearwardly from the second segment, wherein the first segment and the second segment are aligned along a common vertical plane, and wherein the fourth segment extends upwardly from the third segment.

9. The fertilizer tube system of claim 8, wherein the third segment and the fourth segment are each comprised of a substantially straight structure.

10. The fertilizer tube system of claim 8, wherein the fourth segment extends rearwardly.

11. The fertilizer tube system of claim 10, wherein the third segment and the fourth segment both extend rearwardly at an approximately same angle with respect to the horizontal plane.

12. The fertilizer tube system of claim 8, wherein the third segment is not aligned along the common vertical plane.

13. The fertilizer tube system of claim 12, wherein the third segment extends to the right of the common vertical plane.

14. The fertilizer tube system of claim 13, wherein the fourth segment extends at angle between the common vertical plane and the third segment.

15. The fertilizer tube system of claim 1, wherein the upper connector is comprised of an inner portion, an outer portion and an aperture within the outer portion.

16. The fertilizer tube system of claim 1, wherein the intermediate connector is comprised of an inner portion extending rearwardly, a middle portion extending rearwardly from the inner portion of the intermediate connector at an angle, an outer portion extending rearwardly from the middle portion of the intermediate connector substantially parallel with respect to the inner portion of the intermediate connector, and an aperture within the outer portion.

17. A method of attaching the fertilizer tube system of claim 1, said method comprising the steps of:
    attaching the intermediate connector to the axle of the planter shank;
    attaching the upper connector to the upper fastener of the planter frame; and
    attaching the lower connector to the lower portion of the planter shank.

* * * * *